(12) United States Patent
Miller et al.

(10) Patent No.: US 6,177,778 B1
(45) Date of Patent: Jan. 23, 2001

(54) BATTERY ADAPTER CAPABLE OF RECEIVING POWER FROM AT LEAST TWO POWER SOURCES AND OF BEING IN A DOCKING STATION, AND A BATTERY ARRANGEMENT INCLUDING A BATTERY CHARGER AND A DOCKING STATION

(75) Inventors: Jay Stephen Miller, Mason City; Michael Scott Frank, Clear Lake; Trent Lee Bollman, Orchard, all of IA (US)

(73) Assignee: Alexander Manufacturing Corp., Mason City, IA (US)

(*) Notice: Under 35 U.S.C. 154(b), the term of this patent shall be extended for 0 days.

(21) Appl. No.: 09/282,078

(22) Filed: Mar. 30, 1999

(51) Int. Cl.$^7$ .................................................. H02J 7/00
(52) U.S. Cl. ............................................................ 320/112
(58) Field of Search .................................. 320/112, 113, 320/114, 115, 165; 307/66, 72, 150; 363/142

(56) References Cited

U.S. PATENT DOCUMENTS

| | | | |
|---|---|---|---|
| 5,012,381 | * 4/1991 | Elliott et al. | 320/165 |
| 5,349,489 | * 9/1994 | Schelen | 320/165 |
| 5,686,808 | * 11/1997 | Lutz | 320/110 |
| 5,805,439 | * 9/1998 | Kruppa | 363/142 |
| 5,818,130 | * 10/1998 | Gass et al. | 320/165 |
| 5,847,543 | * 12/1998 | Carroll | 320/110 |
| 5,859,499 | * 1/1999 | McAfee et al. | 307/66 |
| 5,905,356 | * 5/1999 | Wells | 320/101 |
| 5,914,585 | * 6/1999 | Grabon | 320/115 |
| 5,926,005 | * 7/1999 | Holcomb et al. | 320/113 |
| 5,926,006 | * 7/1999 | Burroughs et al. | 320/115 |
| 5,977,751 | * 11/1999 | Blessing et al. | 320/165 |
| 5,982,149 | * 11/1999 | Shih | 320/165 |
| 5,982,652 | * 11/1999 | Simonelli et al. | 363/142 |
| 6,005,368 | * 12/1999 | Frame | 320/113 |
| 6,023,147 | * 2/2000 | Cargin, Jr. et al. | 320/114 |

OTHER PUBLICATIONS

Alexander Manufacturing Corporation, Diagram of a Proposed Design Transmitted to a Client on Oct. 6, 1997.

* cited by examiner

Primary Examiner—Peter S. Wong
Assistant Examiner—Pia Tibbits
(74) Attorney, Agent, or Firm—Kenyon & Kenyon

(57) ABSTRACT

A battery adapter includes a base unit, a battery holder coupled to the base unit and receiving a battery therein, a first connection arrangement and a second connection arrangement. Each of the first and second connection arrangements is capable of receiving power from an external power source. The external power source may be provided via a docking station. The battery adapter also includes a device which is conductively coupled to each of the first and second connection arrangements. The device receives the power from the first connection arrangement and/or the second connection arrangement for charging and/or discharging the battery.

24 Claims, 6 Drawing Sheets

BATTERY ADAPTER CAPABLE OF
RECEIVING POWER FROM AT LEAST TWO
POWER SOURCES AND OF BEING IN A
DOCKING STATION, AND A BATTERY
ARRANGEMENT INCLUDING A BATTERY
CHARGER AND A DOCKING STATION

FIELD OF THE INVENTION

The present invention relates to a battery adapter for charging and discharging batteries. This battery adapter has two different electrical connections, each being capable of receiving power from an external power source.

BACKGROUND INFORMATION

A conventional battery adapter is described in U.S. Pat. No. 5,818,197. This battery adapter is composed of a battery holder and a base unit. The battery holder is releasably coupled to the base unit which provides power to the battery adapters. When a battery is inserted into the battery holder, this battery is charged using the power received from the base unit. However, if the battery holder is removed from the base unit, the battery holder no longer receives power. Thus, the battery is not charged.

FIG. 1 shows an exemplary illustration of another conventional battery adapter 1 for charging a battery 7. This battery adapter 1 includes a battery holder 2, a base unit 3 and a socket 4. The battery holder 2 is coupled to the base unit 3. The socket 4 is arranged on the base unit 3 for providing power to the battery adapter 1. The power is received from an external power source (not shown). The battery holder 2 has a receptacle portion 13 for receiving the battery 7.

The battery 7 can be inserted into the receptacle portion 13 of the battery holder 2 for charging and/or discharging the battery 7. The receptacle portion 13 has a first external surface 11A, and the battery 7 has a second external surface 12A. The first external surface 11A is dimensioned so that the battery 7 may be inserted into the receptacle portion 13 of the battery holder 2 via its second external surface 12A. The battery holder 2 also includes a first holder contact 5 and a second holder contact 6. The first holder contact 5 is provided for conductively coupling to a first battery contact 11 of battery 7, and the second holder contact 6 is provided for conductively coupling to a second battery contact 12 of the battery 7. Contact locations (i.e., 5, 6, 11A and 12A) and quantity of contacts may vary. When the battery 7 is lowered into the battery holder 2 in a first direction A, the first and second holder contacts 5, 6 of the battery holder 2 are electrically connected to the respective first and second battery contacts 11, 12 of the battery 7. In this manner, the battery 7 is either charged or discharged by the battery adapter 3.

The socket 4 can be either permanently coupled to the external power source or detachably connectable to a connection unit 9 by inserting the connection unit 9 into the socket in a second direction B. The connection unit 9 is dimensioned to be inserted into the socket 4 and maintained therein. When the connection unit 9 is inserted into the socket 4, the battery holder 2 receives power which flows from the external power source and through an electrical cable 10 to reach to the connection unit 9. Power is then received at the socket 4 of the battery holder 2. Thus, the battery adapter 1 receives power from the external unit, and utilizes this power to either charge or discharge the battery 7.

With the conventional battery adapters, it is not possible to charge and/or discharge the battery using two different electrical connectors to allow each of the electrical connectors to provide power to the battery adapter. The conventional battery adapters also lack the reverse battery protection capabilities which prevent destruction or damage of the battery and/or the battery adaptor if the battery is improperly placed into the battery holder.

SUMMARY OF THE INVENTION

An exemplary embodiment of a battery adapter according to the present invention includes a base unit, a battery holder coupled to the base unit and receiving a battery therein, a first connection arrangement, and a second connection arrangement. Each of the first and second connection arrangements is capable of receiving power from an external power source. The battery adapter also includes a device which is conductively coupled to each of the first and second connection arrangements. The device receives the power from the first connection arrangement and/or the second connection arrangement for charging and/or discharging the battery.

Another exemplary embodiment of the battery adapter according to the present invention includes a base unit, a battery holder coupled to the base unit and receiving a battery therein, a first connection arrangement, and a second connection arrangement. Each of the first and second connection arrangements are capable of receiving power from an external power source. This exemplary battery adapter also includes a power delivery arrangement, a battery charging/discharging arrangement and a reverse battery protection arrangement. The power delivery arrangement is conductively connected to each of the first and second connection arrangements and receives the power from the first connection arrangement and/or the second connection arrangement. The battery charging/discharging arrangement is conductively connected to the power delivery arrangement and provided for charging and/or discharging the battery. The reverse battery protection arrangement is conductively connected to the battery charging/discharging arrangement. The reverse battery protection arrangement prevents the battery and/or the battery adapter from being damaged or destroyed if the battery is improperly connected to the battery adapter via the battery holder.

There are numerous advantages to enable the battery adapter according to the present invention to receive power from two different power connectors. For example, a user may prefer to power a single adapter without inserting such battery adapter into a docking station using, e.g., a wall receptacle. Alternatively, the user may desire to insert such battery adapter into the docking station (e.g., along with other battery adapters) to enable the battery adapter to receive the necessary power for charging and/or discharging the batteries from the docking station. Such ability to obtain power from different power connectors provides the user with a greater flexibility for powering the battery adapters.

DETAILED DESCRIPTION

Figure 2A:
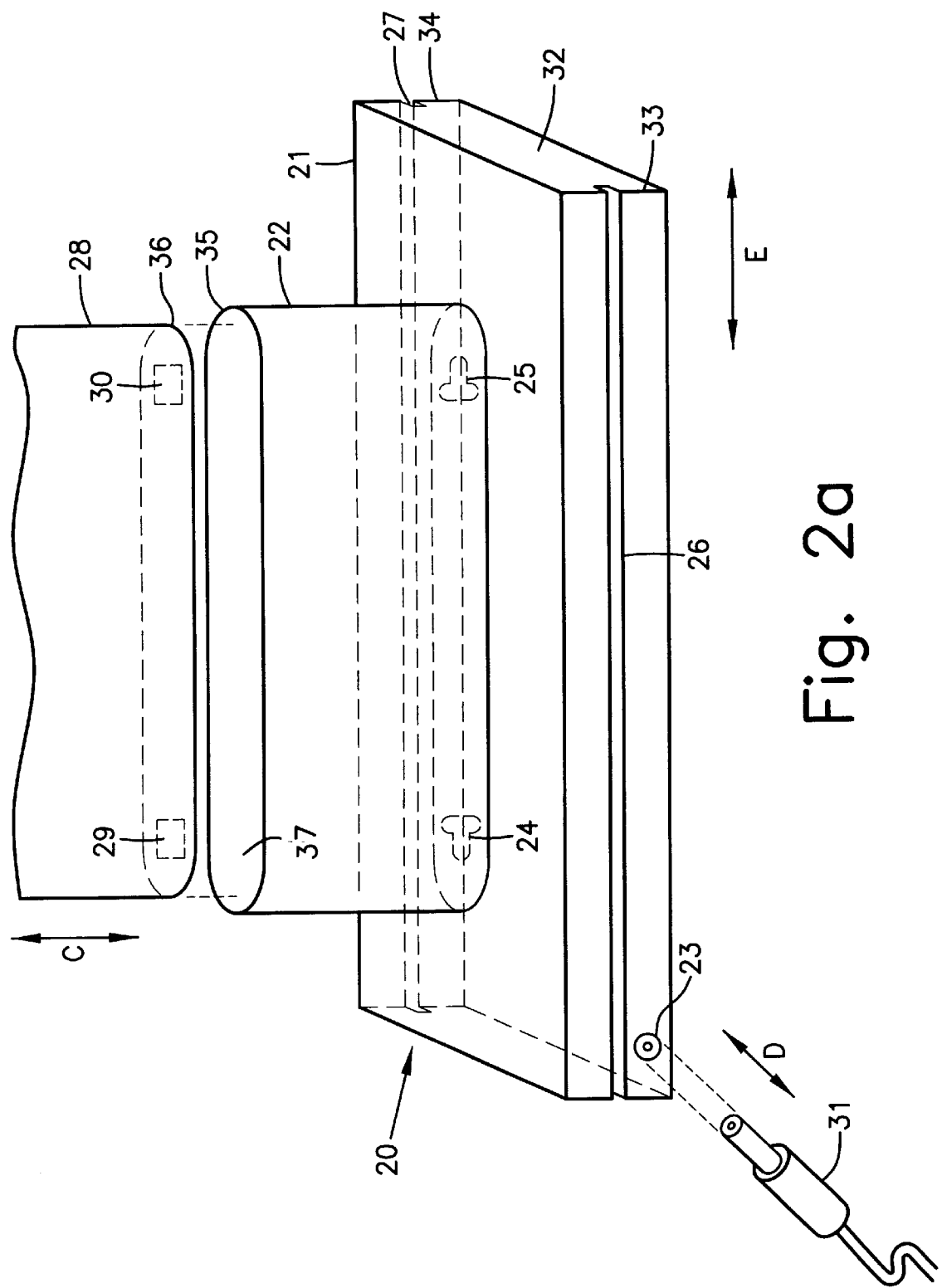
FIG. 2 shows an exemplary embodiment of a battery adapter according to the present invention which is insertable into a bay of a docking station.
Figure 2B:
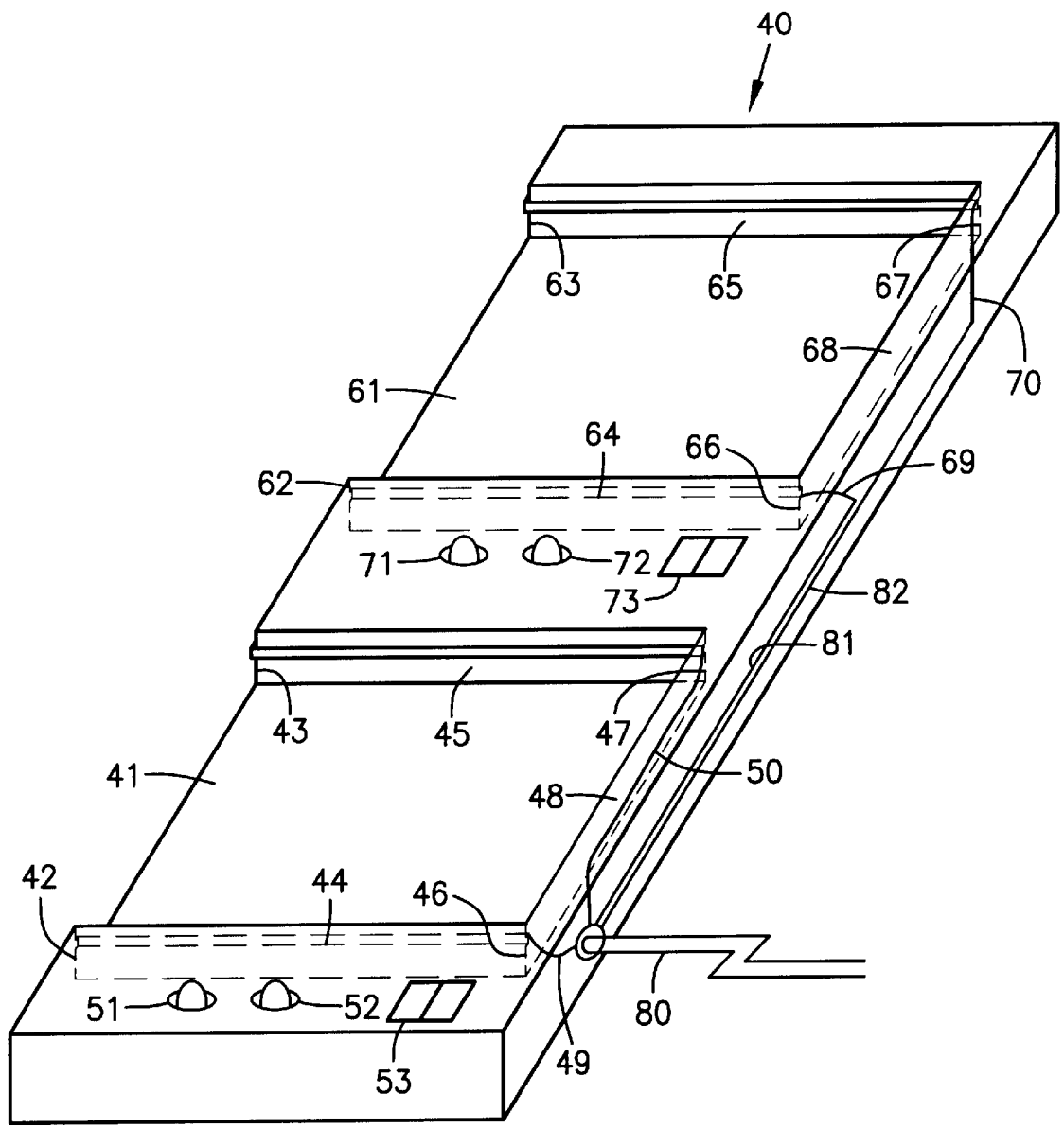

FIG. 2 shows an exemplary embodiment of a battery adapter 20 according to the present invention. The battery adapter 20 shown in FIG. 2 includes a battery holder 22 and a base unit 21. The battery holder 22 is connected to the base unit 21 and has a receptacle portion 37 for receiving a battery 28. The receptacle portion 37 of the battery holder 22 can be preconfigured to receive various types of batteries (e.g., a nickel cadmium battery, a nickel metal-hydride battery, a lithium battery, etc.).

The battery 28 can be inserted into the receptacle portion 37 of the battery holder 22 for charging and/or discharging the battery 28. In particular, the battery 28 is inserted into the receptacle portion 37 of the battery holder 22. The external portion 36 of the battery 28 has a smaller geometry than the geometry of an external surface 35 of the battery holder 22. Thus, the battery 28 may be inserted into the receptacle portion 37, for charging and/or discharging.

The battery adapter 20 includes a first adaptor contact 24 and a second adaptor contact 25. The first and second adaptor contacts 24, 25 can be provided in the base unit 21, in the battery holder 22 or separately therebetween. The first adaptor contact 24 is provided for conductively connecting to a first battery contact 29 of the battery 28, and the second adaptor contact 25 is provided for conductively connecting to a second battery contact 30 of the battery 28. As the battery 28 is lowered into the battery holder 22 in a third direction C, the first and second adapter contacts 24, 25 of the battery adapter 20 are electrically connected to the respective first and second battery contacts 29, 30 of the battery 28. When the battery 28 completes its charging procedure and/or a discharging procedure, the battery 28 may be removed from the battery holder 22 in the third direction C.

Figure 1:
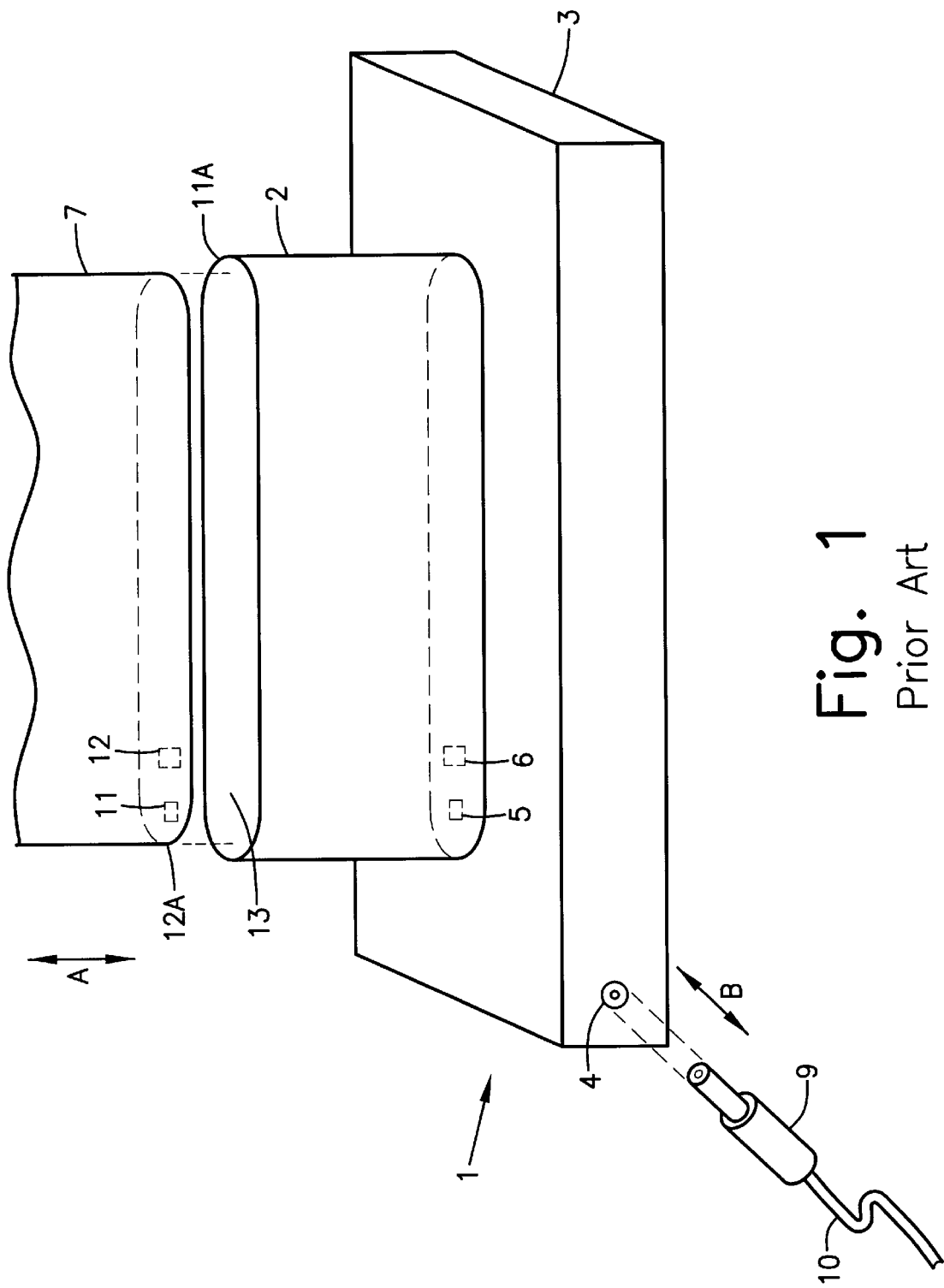
FIG. 1 shows a conventional battery adapter for charging a battery.

The battery adapter 20 according to the present invention also includes a first electrical connector 23 and at least one second electrical connector (e.g., a first electrically conductive groove 26 and a second electrically conductive groove 27). The first electrical connector 23 may be an electrically conductive socket (which is similar to the socket 4 shown in FIG. 1) and may be provided in the base unit 21. The second electrical connector may include a first conductive groove 26 and a second conductive groove 27. Each of the first electrical connector 23 and the second electrical connector 26, 27 can provide an external power to the battery adapter 20 from an external power source. Thus, the battery adapter 20 can receive the external power, interchangeably, from the first electrical connector 23 and/or from the second electrical connector 26, 27.

The first electrical connector 23 can be either permanently coupled to the external power source or detachably connectable to a connection unit 31 (which is coupled to a power source—not shown). When the connection unit 31 is inserted into the first electrical connector 23 in a fourth direction D, the battery adapter 20 receives the external power, which flows from the connection unit 31. A user may disconnect the connection unit 31 from the first connector 23 by removing the connection unit 31 from the first connector 23 in the fourth direction D, and thus interrupt the external power provided to the battery adapter 20.

The second electrical connector 26, 27 receives power from a docking station 40 (an exemplary embodiment of which is shown in FIG. 2). The docking station 40 may have one or more bays, each for accommodating a separate battery adapter. In FIG. 2, the docking station 40 has two docking bays 41, 61. The first bay 41 is dimensioned to receive (e.g., to slidably receive) the battery adapter 20 therein. Thus, the battery adapter 20 can be coupled to the first bay 41 by inserting the battery adapter into the first bay 41 in a fifth direction E (i.e., so that the battery adapter 20 slides into the first bay 41 between a first entering edge 42 and a second entering edge 43 of the first bay 41).

In the exemplary embodiment shown in FIG. 2, as a forward side 32 of the battery adapter 20 enters the first bay 41, the first conductive groove 26 of the battery adapter 20 receives (and makes electrical contact with) a first conductive strip 44 of the first bay 41, and the second conductive groove 27 of the battery adapter receives (and makes electrical contact with) a second conductive strip 45 of the first bay 41. The battery adapter 20 slidably travels within the first bay 41 until the forward side 32 of the battery adapter 20 reaches a rear side 48 of the first bay 41.

The battery adapter 20 may be secured within the first bay 41 of the docking station 40 to achieve a stable electrical connection. For example, when the forward side 32 of the battery adapter 20 reaches the rear side 48 of the first bay 41, a first corner edge 33 of the battery adapter 20 may engage with a corresponding first corner edge 46 of the first bay 41, and a second corner edge 34 of the battery adapter 20 may engage with a corresponding second corner edge 47 of the first bay 41.

The first and second conductive strips 44, 45 of the first bay are adapted to provide power to the battery adaptor 20, and are electrically connected to an external power source (not shown). For example, the first conductive strip 44 is electrically coupled to a first conductor 49, and the second conductive strip 45 is electrically coupled to a second conductor 50. The first and second conductors 49, 50 are electrically connected to the external power source (e.g., an AC power line, a DC power line, etc.) via an electrical wire 80. In this manner, the first and second conductive strips 44, 45 receive electrical power from the external power source, and provide this external power to the battery adapter 20 when the first and second conductive grooves 26, 27 of the battery adapter 20 are electrically connected to the first and second conductive strips 44, 45. The battery adapter 20 may have electrical strips instead of the first and second conductive grooves 26, 27. Similarly, the first bay 41 can have corresponding electrically conductive grooves instead of the first and second strips 44, 45. Other electrically connecting arrangements are, of course, possible.

The docking station 40 may also have a first indicator 51 (e.g., an LED), a second indicator 52 (e.g., an LED) and a first display device 53 (e.g., a liquid crystal display). These elements are associated with the operation of the first bay 41. For example, the first indicator 51 may be turned on when the first bay 41 is receiving power from the external power source via the electrical wire 80, and turned off when the first bay 41 is no longer receiving power from the external power source. The second indicator 52 may be turned on when the battery adapter 20 is charging in the first bay 41, and turned off when the battery adapter 20 is removed from the first bay 41. The display device 53 may indicate the amount of power that is maintained by the battery 28 (which is situated in the battery holder 22 of the battery adapter 20).

As shown in FIG. 2, the docking station 40 also has the second bay 61 for receiving a further battery adapter. As shown in FIG. 2, the second bay 61 has front sides 62, 63 between which the further battery adapter can be slidably inserted into the second bay 61. The second bay 61 also has first and second strips 64, 65 for electrically contacting electrically conductive grooves of the further battery adapter. The first and second strips 64, 65 are electrically coupled to third and fourth conductors 69, 70, respectively. The first and second conductors 69, 70 are electrically connected to first and second lead lines 81, 82, respectively to receive power from the external power source via the electrical wire 80. The docking station 40 also has a third indicator 71 (e.g., an LED), a fourth indicator 72 (e.g., an LED) and a second display device 73 (e.g., a liquid crystal display). These elements 71, 72, 73 have similar functions as the functions of the elements 51, 52, 53 of the first bay 41 described above. The docking station 40 may also have further bays for receiving additional battery adapters.

Figure 3:
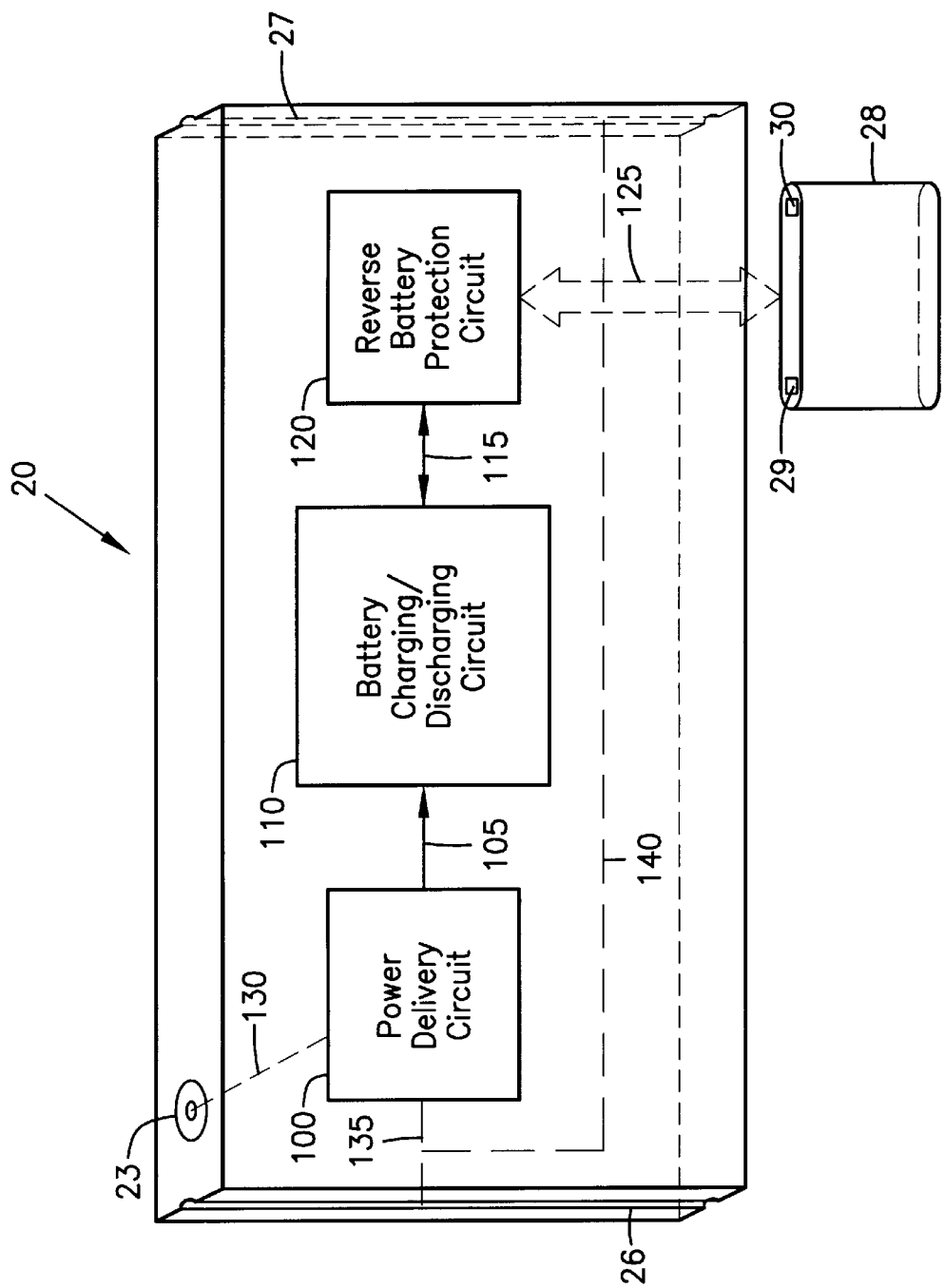
FIG. 3 shows the battery adapter illustrated in FIG. 2 which includes a power deliver circuit, a battery charging/discharging circuit and a reverse battery protection circuit.

FIG. 3 shows an exemplary embodiment of a circuit arrangement which is disposed in the battery adapter 20 and is capable of receiving power from the first electrical connector 23 and from the second electrical connector 26, 27 (e.g., the first groove 26 and the second groove 27). The circuit arrangement includes a power delivery circuit 100, a battery charging/discharging circuit 110 and a reverse battery protection circuit 120. The power delivery circuit 100 is connected to the first electrical connector 23 via a first electrical connection 130. The power delivery circuit 100 is also connected to the first groove 26 via a second electrical connection 135, and to the second groove 27 via a third electrical connection 140. In this manner, the power delivery circuit 100 is capable of receiving the external power from the first electrical connector 23 and from the second electrical connector 26, 27.

The power delivery circuit 100 is electrically connected to the battery charging/discharging circuit 110 via a first connecting arrangement 105 for receiving the external power. The battery charging/discharging circuit 110 is electrically connected to the reverse battery protection circuit 120 via a second connecting arrangement 115. Each of the first and second connecting arrangements 105, 115 may include one or more electrically conductive wires, fiber optic wires, etc. The reverse battery protection circuit 120 is electrically connected to the battery 28 (which is inserted into the battery holder 22) via a third connecting arrangement 125. The third connecting arrangement can also be, e.g., one or more conductive wires. For example, the reverse battery protection circuit 120 may be connected to the first and second adaptor contacts 24, 25 via the third connecting arrangement 125. When the battery 28 is inserted in the battery holder 22, the first adaptor contact 24 of the battery adapter 20 electrically contacts the first battery contact 29 of the battery 28, and the second adaptor contact 25 of the battery adapter 20 electrically contacts the second battery contact 30 of the battery 28. In this manner, the reverse battery protection circuit 120 electrically connects to the battery 28 when the battery 28 is properly inserted into the battery holder 22 of the battery adapter 20.

In the exemplary embodiment, the battery charging/discharging circuit 110 is capable of identifying a particular type and/or a battery chemistry of the battery 28 when the first adaptor contact 24 electrically contacts the first battery contact 29, and the second adaptor contact 25 electrically contacts the second battery contact 30. Through such interconnections and via the third connecting arrangement 125, the battery charging/discharging circuit 110 determines the current provided into or out of the battery 28, a charge rate of the battery, etc. Thus, using these exemplary parameters obtained from the battery 28, the battery charging/discharging circuit 110 can determine whether the battery 28 is a lithium battery, a nickel metal hydride battery, a nickel cadmium battery, etc. Procedures to determine the chemistries of the batteries are described in U.S. Pat. No. 5,818,197, the entire disclosure of which is expressly incorporated herein by reference.

Figure 4:
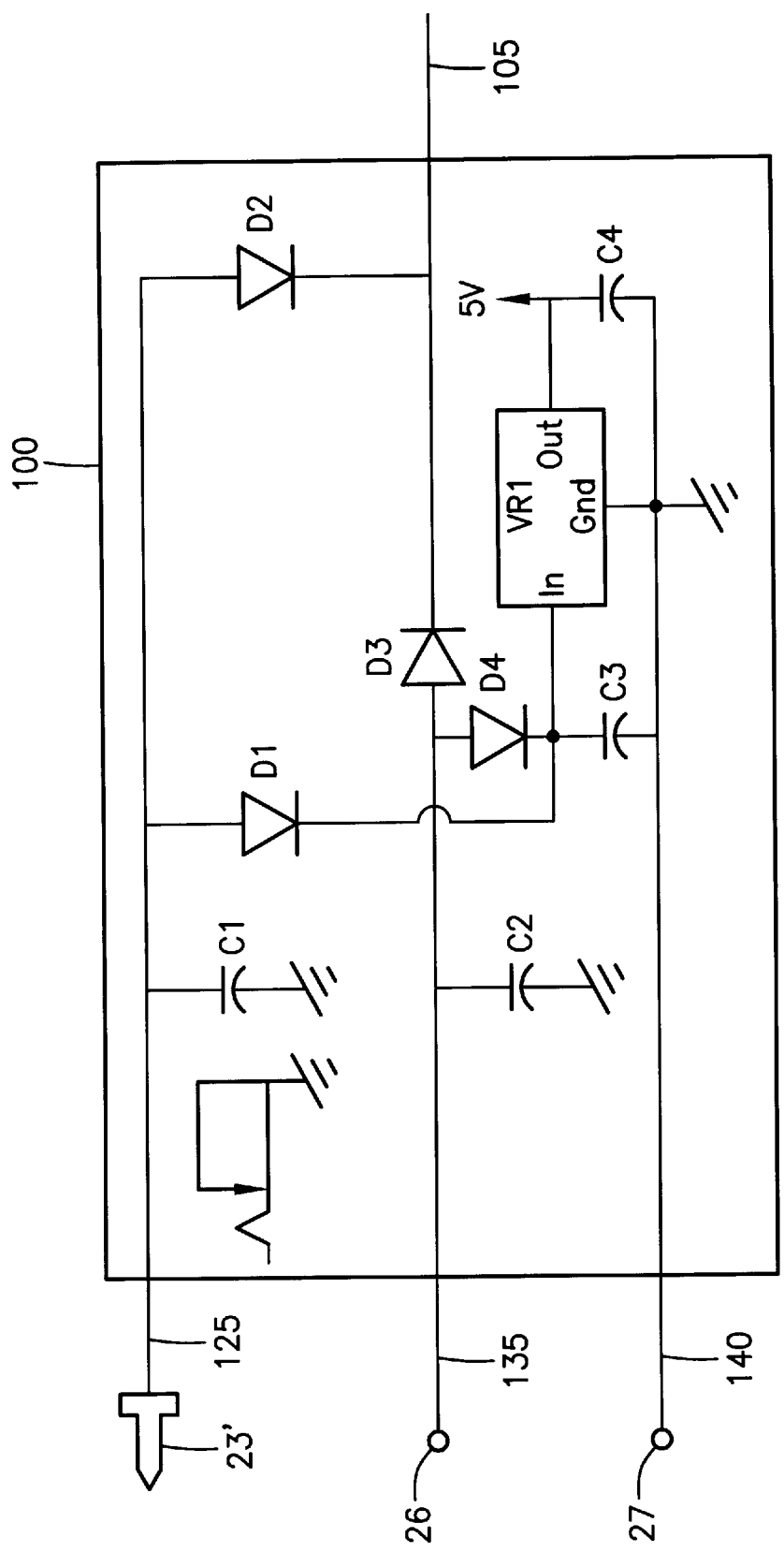
FIG. 4 shows an exemplary schematic diagram of the power deliver circuit illustrated in FIG. 3.

An exemplary embodiment of the power delivery circuit 100 is shown in FIG. 4. As described above with reference to FIG. 3, the power delivery circuit 100 receives external power from two connectors. For example, the power delivery circuit 100 is connected to the first electrical connector 23 (e.g., the electrical socket) via the first electrical connection 130, and to the second electrical connector 26, 27 (e.g., the first groove 26 and the second groove 27) via the second and third electrical connections 135, 140.

When the external power is provided from the first electrical connector 23, the current flows (via the first electrical connection 125) to a first diode D1 and to a second diode D2. This occurs, for example, when the connection unit 31 of FIG. 2 is plugged into the first electrical connector 23. The current flowing through the first diode D1 regulates a controller VR1. The current flowing through the second diode D2 provides power to the battery charging/discharging circuit 110 via the first connecting arrangement 105.

When the external power is provided from the second electrical connector 26 (e.g., from the second groove 26), the current flows, via the first electrical connection 135, to a third diode D3 and to a fourth diode D4. This occurs, for example, when the battery adapter 20 of FIG. 2 is mounted in the bay 41 of the docking station 40. The current flowing through the third diode D3 provides power to the battery charging/discharging circuit 110 via the first connecting arrangement 105. The current flowing through the fourth diode D4 regulates the controller VR1. The second groove 27 is provided to complete the circuit connection.

To avoid overloading electrical connectors and to prevent any damage of the battery 28 and/or the battery adapter 20, the current provided by one electrical connector may be isolated from affecting the other electrical connector. This is achieved by connecting the above-described diodes D1, D2, D3, D4 with the electrical connectors. For example, the first and second diodes D1, D2 are provided for isolating the external power provided by the second electrical connector 26, 27 from the first electrical connector 23. Similarly, the third and fourth diodes D3, D4 are provided for isolating the power provided by the first electrical connector 23 from the second electrical connector 26, 27. Capacitors C3, C4 and the controller VR1 provide a regulated 5V voltage. This regulated voltage may turn on the first indicator 51 of the docking to indicate that the external power is being provided to the battery adapter 20. It is also possible to provide a visible indicator on the battery adapter 20 to indicate that the external power is being provided to the battery 28.

It is also possible to isolate the electrical connectors from one another using other arrangements. For example, it is possible to provide a switching arrangement (not shown) which would disrupt a circuit connection to one electrical connector when another electrical connector is providing power to the battery charging/discharging circuit 110. This switching arrangement can include at least one switch (e.g., a mechanical switch, an electrical switch, etc.) which is regulated by a controller. The controller would determine which of the electrical connectors is providing the external power, and thus control the switch to prevent any current from flowing to the electrical connector which is not providing any external power. The switching arrangement can also include at least one transistor controlled by the controller. In addition, other switching arrangement are conceivable.

Figure 5:
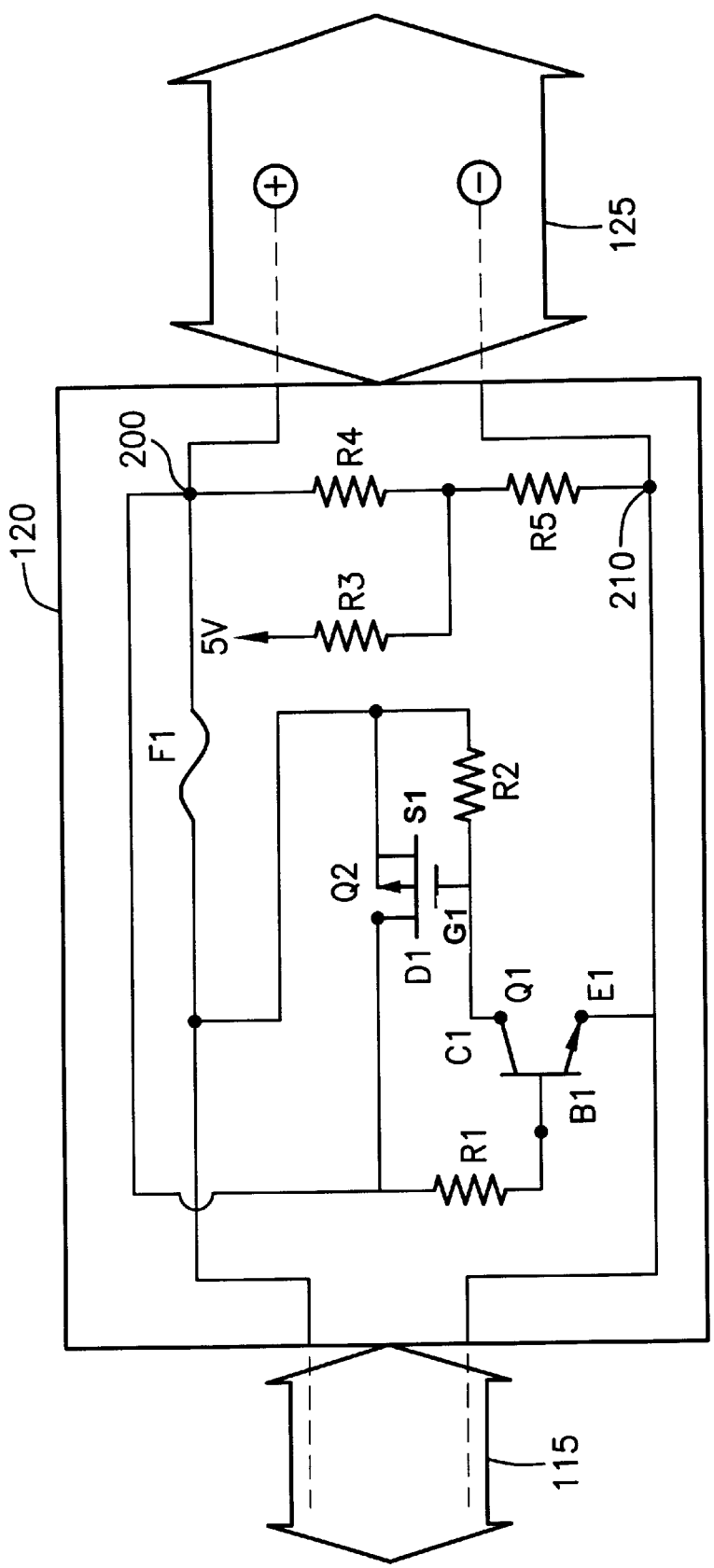
FIG. 5 shows an exemplary schematic diagram of the reverse battery protection circuit illustrated in FIG. 3.

FIG. 5 shows an exemplary embodiment of the reverse battery protection circuit 120 illustrated in FIG. 3. The reverse battery protection circuit 120 prevents the battery 28 from being damaged, e.g., if the battery 28 is improperly inserted into the battery holder 28 (which may generate a short circuit, an overload, etc.). The reverse battery protection circuit 120 may also prevent any such damage to the battery adapter 20. As described above with reference to FIG. 3, the reverse battery protection circuit 120 is electrically connected to the battery charging/discharging circuit 110 via a second connecting arrangement 115. The reverse battery protection circuit 120 also communicates with the battery 28 via the third connecting arrangement 125. As illustrated in FIG. 5, the reverse battery protection circuit 120 may include a first switch Q1, a second switch Q2, a first resistor R1, a second resistor R2 and a fuse F1. The fuse F1 does not have to be used when utilizing the reverse battery protection features of the reverse battery protection circuit 120.

The first adaptor contact 24 in the battery adapter 20 is conductively connected to, e.g., a first terminal 200 of the reverse battery protection circuit 120. The second adaptor connector 25 in the battery adapter 20 is conductively connected to a second terminal 210 of the reverse battery protection circuit 120. In this manner, the first terminal 200 is capable of contacting one of the first and second battery contacts 29, 30 of the battery 28, and the second terminal 210 is capable of contacting another one of the first and second battery contacts 29, 30 of the battery 28.

In operation, when the battery 28 is properly connected to the battery adapter 20 via the first and second battery contacts 29, 30 (e.g., the first battery contact 29 is electrically connected to the first terminal 200, and the second battery contact 30 is electrically connected to the second terminal 210), the first switch Q1 is turned on because the voltage at a terminal B1 of the first switch Q1 is higher than the voltage at a terminal E1. By turning on the first switch Q1, a terminal G1 enables the second switch Q2 (i.e., switches on the second switch Q2), and thus the current flows between a terminal D1 and a terminal S1 of the second switch Q2.

When the battery 28 is improperly connected to the battery adapter 20 via the first and second battery contacts 29, 30 (e.g., the first battery contact 29 is electrically connected to the second terminal 210, and the second battery contact 30 is electrically connected to the first terminal 200), the first switch Q1 is turned off because the voltage at the terminal B1 of the first switch Q1 is lower than the voltage at the terminal E1. Because the first switch Q1 is turned off, the second switch Q2 is also switched off, and thus the current is prevented from flowing between the terminal D1 and the terminal S1 of the second switch Q2.

What is claimed is:

1. A battery adapter, comprising:
   a base unit;
   a battery holder coupled to the base unit and receiving a battery therein;
   a first connection arrangement;
   a second connection arrangement, each of the first and second connection arrangements being capable of receiving power from an external power source; and
   a circuit arrangement that at least one of charges and discharges the battery, the circuit arrangement being conductively coupled to each of the first and second connection arrangements, the circuit arrangement receiving the power from at least one of the first connection arrangement and the second connection arrangement.

2. The battery adapter according to claim 1, wherein the circuit arrangement includes a power delivery arrangement and a battery charging/discharging arrangement which is conductively connected to the power delivery arrangement.

3. The battery adapter according to claim 2,
   wherein the power delivery arrangement is conductively conducted to each of the first and second connection arrangements,
   wherein the battery charging/discharging arrangement receives the power from the power delivery arrangement, and
   wherein the battery charging/discharging arrangement at least one of charges and discharges the battery by utilizing the received power.

4. The battery adapter according to claim 2,
   wherein the current is generated in one of the first and second connection arrangements by the power received from the external power source, and
   wherein the power delivery arrangement prevents the current from flowing through one of the first and second connection arrangements into another one of the first and second connection arrangements.

5. The battery adapter according to claim 4, wherein the power delivery arrangement includes a first set of diodes and a second set of diodes, the first set of diodes preventing the current from flowing into the second connection arrangement, the second set of diodes preventing the current from flowing into the first connection arrangement.

6. The battery adapter according to claim 5, wherein the first set of diodes is conductively connected to the first connection arrangement, and the second set of diodes is conductively connected to the second connection arrangement.

7. The battery adapter according to claim 2, further comprising:
   a reverse battery protection arrangement electrically coupled to the battery charging/discharging arrangement, the reverse battery protection arrangement disabling an electrical connection between the battery and the battery charging/discharging arrangement if the battery is improperly connected to the battery adapter via the battery holder.

8. The battery adapter according to claim 2, wherein the power delivery arrangement includes a switching arrangement and a sensing arrangement, the sensing arrangement detecting the current flowing in a single arrangement of the first connection arrangement and the second connection arrangement, the sensing arrangement causing the switching arrangement to electrically connect the single arrangement to the battery.

9. The battery adapter according to claim 1, wherein the first connection arrangement is a conductive socket which is adapted for receiving a power connection plug from the external power source.

10. The battery adapter according to claim 1, wherein the second connection arrangement includes at least one conductive grooved member which is adapted for coupling to a conductive strip of the external power source.

11. The battery adapter according to claim 1, wherein the base unit is adapted for inserting into a bay of a docking station, and wherein the docking station provides the power to at least one of the first connection arrangement and the second connection arrangement when the base unit is inserted into the bay of the docking station.

12. The battery adapter according to claim 1, further comprising:
a reverse battery protection arrangement conductively coupled to the circuit arrangement, the reverse battery protection arrangement preventing at least one of the battery and the battery adapter from being damaged if the battery is improperly connected to the battery adapter via the battery holder.

13. The battery adapter according to claim 12,
wherein the reverse battery protection arrangement includes a sensing arrangement and a switching arrangement,
wherein, if the sensing arrangement determines that the battery is properly connected to the battery adapter, the sensing arrangement controls the switching arrangement to enable an electrical connection between the circuit arrangement and the battery, and
wherein, if the sensing arrangement determines that the battery is improperly connected to the battery adapter, the sensing arrangement controls the switching arrangement to disable the electrical connection between the circuit arrangement and the battery.

14. The battery adapter according to claim 1, wherein the first connection arrangement is configured to receive the power from a power socket, and wherein the second connection arrangement is configured to receive the power from a power connector which is provided in a bay of a docking station.

15. The battery adapter according to claim 1, wherein:
the battery holder is fixedly coupled to the base unit; and
the first connection arrangement and the second connection arrangement are part of the base unit.

16. A battery arrangement, comprising:
a docking station including at least one bay, the at least one bay including a power arrangement for providing power; and
at least one battery adapter including:
a base unit adapted for coupling to the at least one bay of the docking station,
a battery holder coupled to the base unit and receiving a battery therein,
a first connection arrangement and a second connection arrangement, each of the first and second connection arrangements being capable of receiving power from an external source, at least one of the first and second connection arrangements being capable of receiving power from the power arrangement, and
a circuit arrangement that at least one of charges and discharges the battery, the circuit arrangement being conductively coupled to each of the first and second connection arrangements, the device receiving the power from at least one of the first connection arrangement and the second connection arrangement.

17. The battery arrangement according to claim 16,
wherein the power arrangement includes at least one conductive strip which is electrically coupled to an external power source,
wherein the first connection arrangement receives the power from the power arrangement when the at least one battery adapter is inserted into the at least one bay, and
wherein the first connection arrangement includes a conductive groove portion for coupling to the at least one conductive strip of the power arrangement.

18. The battery arrangement according to claim 16, wherein the docking station includes at least one first indicator and at least one second indicator, the at least one first indicator being actuated when the docking station receives the power from the external power source, the at least one second indicator being actuated when the base unit is charging in the docking station via the at least one bay.

19. The battery arrangement according to claim 16, wherein the battery adapter includes a reverse battery protection arrangement which is conductively coupled to the circuit arrangement, the reverse battery protection arrangement preventing at least one of the battery and the battery adapter from being damaged if the battery is improperly connected to the battery adapter via the battery holder.

20. The battery arrangement according to claim 16, wherein:
the battery holder is fixedly coupled to the base unit; and
the first connection arrangement and the second connection arrangement are part of the base unit.

21. A battery adapter, comprising:
a base unit;
a battery holder coupled to the base unit and receiving a battery therein;
a first connection arrangement;
a second connection arrangement, each of the first and second connection arrangements being capable of receiving power from an external power source;
a power delivery arrangement conductively connected to each of the first and second connection arrangements, the power delivery arrangement receiving the power from at least one of the first connection arrangement and the second connection arrangement;
a battery charging/discharging arrangement conductively connected to the power delivery arrangement, the power delivery arrangement providing power to the battery charging/discharging arrangement, the battery charging/discharging arrangement being provided for at least one of charging and discharging the battery; and
a reverse battery protection arrangement conductively coupled to the battery charging/discharging arrangement, the reverse battery protection arrangement preventing at least one of the battery and the battery adapter from being damaged if the battery is improperly connected to the battery adapter via the battery holder.

22. The battery adapter according to claim 21, wherein the base unit is adapted to be inserted into a bay of a docking station, and wherein the docking station provides the power to at least one of the first connection arrangement and the second connection arrangement when the base unit is inserted into the bay of the docking station.

23. The battery adapter according to claim 21, wherein:
the battery holder is fixedly coupled to the base unit; and
the first connection arrangement and the second connection arrangement are part of the base unit.

24. A battery adapter, comprising:
a base unit;
a battery holder coupled to the base unit and receiving a battery therein;
a first connection arrangement;
a second connection arrangement, each of the first and second connection arrangements being capable of receiving power from an external power source; and
a circuit arrangement that at least one of charges and discharges the battery, the circuit arrangement being conductively coupled to each of the first and second connection arrangements, the circuit arrangement receiving the power from both of the first connection arrangement and the second connection arrangement.

* * * * *